United States Patent
Takahashi

(10) Patent No.: US 12,205,554 B2
(45) Date of Patent: Jan. 21, 2025

(54) LIQUID CRYSTAL DISPLAY APPARATUS

(71) Applicant: Sharp Display Technology Corporation, Kameyama (JP)

(72) Inventor: Yoshihisa Takahashi, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/629,840

(22) Filed: Apr. 8, 2024

(65) Prior Publication Data

US 2024/0379073 A1 Nov. 14, 2024

Related U.S. Application Data

(60) Provisional application No. 63/465,228, filed on May 9, 2023.

(51) Int. Cl.
*G09G 3/36* (2006.01)
*G02F 1/1362* (2006.01)
*G02F 1/1368* (2006.01)

(52) U.S. Cl.
CPC ......... *G09G 3/3607* (2013.01); *G09G 3/3677* (2013.01); *G02F 1/136213* (2013.01); *G02F 1/13624* (2013.01); *G02F 1/136286* (2013.01); *G02F 1/1368* (2013.01); *G09G 2300/0819* (2013.01); *G09G 2300/0852* (2013.01); *G09G 2310/0286* (2013.01); *G09G 2310/08* (2013.01)

(58) Field of Classification Search
CPC ............... G09G 3/3607; G09G 3/3677; G09G 2300/0819; G09G 2300/0852; G09G 2310/0286; G09G 2310/08; G02F 1/136213; G02F 1/13624; G02F 1/136286; G02F 1/1368
See application file for complete search history.

(56) References Cited

U.S. PATENT DOCUMENTS

| 2007/0064164 | A1 | 3/2007 | Tasaka et al. |
| 2012/0306732 | A1* | 12/2012 | Sugihara ............ G09G 3/3607 345/88 |
| 2018/0252971 | A1 | 9/2018 | Irie et al. |

FOREIGN PATENT DOCUMENTS

| JP | 2006-276411 A | 10/2006 |
| WO | 2017/033341 A1 | 3/2017 |
| WO | 2017/104006 A1 | 6/2017 |

* cited by examiner

*Primary Examiner* — Benjamin C Lee
*Assistant Examiner* — Nathan P Brittingham
(74) *Attorney, Agent, or Firm* — ScienBiziP, P.C.

(57) ABSTRACT

A liquid crystal display apparatus has a three-TFT structure in which each of pixels includes a first liquid crystal capacitor including a first pixel electrode, a second liquid crystal capacitor including a second pixel electrode, a first TFT including a drain electrode connected to the first pixel electrode, a second TFT including a drain electrode connected to the second pixel electrode, and a buffer capacitor including a buffer capacitor electrode connected to the second pixel electrode via a third TFT. In the liquid crystal display apparatus, a configuration is adopted in which a gate scanning signal is independently supplied to a plurality of gate bus lines one by one, and a sub-gate-on pulse is substantially simultaneously applied to the third TFTs belonging to at least two pixel rows.

14 Claims, 18 Drawing Sheets

LIQUID CRYSTAL DISPLAY APPARATUS

CROSS-REFERENCE TO RELATED APPLICATIONS

This application claims the benefit of priority to U.S. Provisional Application No. 63/465,228 filed on May 9, 2023. The entire contents of the above-identified application are hereby incorporated by reference.

BACKGROUND

Technical Field

The disclosure relates to a liquid crystal display apparatus, and particularly relates to a liquid crystal display apparatus having a structure suitable as a large and/or high-resolution liquid crystal display apparatus.

Liquid crystal display apparatuses have been increasing in size and resolution. In order to improve the gray scale display characteristics (γ characteristics) at oblique viewing angles, liquid crystal display apparatuses are widespread in which each pixel consists of a first pixel (bright pixel) that displays a gray scale higher than a gray scale to be displayed and a second pixel (dark pixel) that displays a lower gray scale than the gray scale to be displayed. Such a pixel structure is sometimes referred to as a multi-pixel structure or a pixel division structure. The first pixel and the second pixel possessed by each pixel are sometimes referred to as a first subpixel (bright subpixel) and a second subpixel (dark subpixel), respectively.

A liquid crystal display apparatus having a multi-pixel structure and including three thin film transistors (TFTs) in each pixel is disclosed in JP 2006-276411 A. Hereinafter, a structure in which each pixel includes three TFTs described in JP 2006-276411 A is sometimes referred to as a "three-TFT structure". The entire disclosure of JP 2006-276411 A is incorporated herein by reference.

Two TFTs of the three TFTs turn on and off connections between pixel electrodes of the first pixel (bright pixel) and the second pixel (dark pixel) and a source bus line, respectively. For example, a drain electrode of a first TFT is connected to a first pixel electrode of the first pixel, and a drain electrode of a second TFT is connected to a second pixel electrode of the second pixel. Gate electrodes of the first TFT and the second TFT are connected to a common gate bus line, and source electrodes of the first TFT and the second TFT are connected to a common source bus line. A third TFT turns on and off a connection between a buffer capacitor electrode and the second pixel electrode. A gate electrode of the third TFT is connected to a next stage (e.g., (n+1)-th) gate bus line of a (e.g., n-th) gate bus line to which the gate electrodes of the first TFT and the second TFT are connected.

The first TFT and the second TFT are simultaneously turned on by a gate-on pulse included in a gate scanning signal supplied to the common gate bus line, and a display signal voltage supplied to the common source bus line is applied to the first pixel electrode and the second pixel electrode. After the first TFT and the second TFT are turned off, the third TFT is turned on and the second pixel electrode and the buffer capacitor electrode are electrically connected. Since a second liquid crystal capacitor including the second pixel electrode and a buffer capacitor including the buffer capacitor electrode are electrically connected, the charge accumulated in the second liquid crystal capacitor is transferred to the buffer capacitor, and as a result, the voltage held by the second liquid crystal capacitor decreases and the second pixel becomes a dark pixel.

WO 2017-033341 discloses a configuration in which, in a configuration in which two pixel rows are scanned by a common gate scanning signal, the common scanning signal is supplied to two discharge signal lines (which may be referred to as "sub-gate bus lines" in this specification) corresponding to the two pixel rows and each connected to a gate of the third TFT (FIG. 21 and a fifth modified example of WO 2017-033341).

In addition, WO 2017-104006 discloses a liquid crystal display apparatus capable of adjusting the timing of a sub-gate-on pulse included in a sub-gate scanning signal supplied to the sub-gate bus line connected to the gate electrode of the third TFT. By adjusting the timing of the sub-gate-on pulse, the degree of the effect of the multi-pixel structure can be adjusted.

SUMMARY

In the fifth modified example of WO 2017-033341, in a similar manner as with the discharge signal lines (sub-gate bus lines), the gate bus lines are also configured such that two at a time are supplied with a common scanning signal, and thus, twice as many source bus lines for supplying the display signal voltage are required. As a result, problems arise such as wiring line layout efficiency (i.e., pixel aperture ratio) in a display region being low, increased cost due to an increase in the number of drivers for supplying the display signal voltage, and the like.

When the three-TFT structure described in WO 2017-104006 is employed, the sub-gate scanning signal, including the sub-gate-on pulse for turning on the third TFT at a different timing from that of the first TFT and the second TFT, is required. In this case, a space for arranging the sub-gate bus line for the sub-gate scanning signal and a circuit for supplying the sub-gate scanning signal to the sub-gate bus line is required. This is disadvantageous in terms of achieving an increase in the resolution of a liquid crystal display apparatus and/or frame narrowing of the liquid crystal display apparatus. This is referred to as low layout efficiency.

In light of the foregoing, an object of the disclosure is to provide a liquid crystal display apparatus capable of suppressing a deterioration in layout efficiency caused by employing a three-TFT structure.

According to embodiments of the disclosure, solutions described in the following items are provided.

Item 1

A liquid crystal display apparatus includes a plurality of pixels arrayed in a matrix shape having a plurality of pixel rows and a plurality of pixel columns, a plurality of gate bus lines, each being associated with one of the plurality of pixel rows, a plurality of source bus lines, each being associated with one of the plurality of pixel columns, and a plurality of sub-gate bus lines, each being associated with one of the plurality of pixel rows. Each of the plurality of pixels includes a first liquid crystal capacitor including a first pixel electrode, a second liquid crystal capacitor including a second pixel electrode, a first TFT including a drain electrode connected to the first pixel electrode, a second TFT including a drain electrode connected to the second pixel electrode, and a buffer capacitor including a buffer capacitor electrode connected to the second pixel electrode via a third TFT. Gate electrodes of the first TFT and the second TFT of each of the plurality of pixels are connected to the gate bus line associated with the pixel row including the pixel, source electrodes of the first TFT and the second TFT of each of the plurality of pixels are connected to the source bus line associated with the pixel column including the pixel, and a gate electrode of the third TFT of each of the plurality of pixels is connected to the sub-gate bus line associated with the pixel row including the pixel. The liquid crystal display apparatus further includes a source drive circuit configured to supply a source signal to the plurality of source bus lines, and a gate drive circuit configured to supply a gate scanning signal, including a gate-on pulse configured to turn on the first TFT and the second TFT, to the plurality of gate bus lines, and to supply a sub-gate scanning signal, including a sub-gate-on pulse configured to turn on the third TFT, to the plurality of sub-gate bus lines. The gate scanning signal is independently supplied to the plurality of gate bus lines one by one, and the sub-gate-on pulse is substantially simultaneously applied to the third TFTs belonging to at least two of the pixel rows.

Item 2

In the liquid crystal display apparatus according to Item 1, the gate scanning signal is independently supplied to the plurality of gate bus lines one by one, and the sub-gate scanning signal common to at least two of the sub-gate bus lines associated with the at least two pixel rows is supplied to the plurality of sub-gate bus lines.

Item 3

In the liquid crystal display apparatus according to Item 2, the at least two sub-gate bus lines are electrically connected to each other.

Item 4

In the liquid crystal display apparatus according to Item 1, the at least two pixel rows include two pixel rows adjacent to each other, and the third TFTs belonging to the two pixel rows are connected to a common sub-gate bus line.

Item 5

In the liquid crystal display apparatus according to Item 4, the second pixel electrode of one pixel belonging to one of the two pixel rows and the second pixel electrode of a pixel belonging to the other of the two pixel rows and in the same column as the one pixel are arranged to be adjacent to each other with the common sub-gate bus line interposed therebetween in a plan view.

Item 6

In the liquid crystal display apparatus according to Item 4, in a pixel belonging to one of the two pixel rows, the second pixel electrode is located closer to a side of the other of the two pixel rows than the first pixel electrode, and in a pixel belonging to the other of the two pixel rows, the second pixel electrode is located closer to a side of the one of the two pixel rows than the first pixel electrode.

Item 7

In the liquid crystal display apparatus according to any one of Items 1 to 6, the gate drive circuit is formed on a same substrate as the plurality of gate bus lines and the plurality of sub-gate bus lines.

Item 8

In the liquid crystal display apparatus according to Item 7, the gate drive circuit includes a shift register circuit, and in the shift register circuit, a number of stages configured to output the sub-gate scanning signal is smaller than a number of stages configured to output the gate scanning signal.

Item 9

In the liquid crystal display apparatus according to Item 7, the gate drive circuit includes a shift register circuit, and the shift register circuit has a stage configured to output the gate scanning signal and the sub-gate scanning signal.

Item 10

In the liquid crystal display apparatus according to Item 9, the shift register circuit has a stage configured to output only the sub-gate scanning signal.

Item 11

In the liquid crystal display apparatus according to Item 10, the sub-gate scanning signal output from the stage configured to output the gate scanning signal and the sub-gate scanning signal is supplied to one of the sub-gate bus lines, and the sub-gate scanning signal output from the stage configured to output only the sub-gate scanning signal is supplied to at least two of the sub-gate bus lines associated with the at least two pixel rows.

Item 12

In the liquid crystal display apparatus according to any one of Items 9 to 11, the plurality of gate bus lines are not directly connected to the plurality of sub-gate bus lines.

Item 13

In the liquid crystal display apparatus according to Item 7, the gate drive circuit includes a shift register circuit, and a p phase (p is an integer of 2 or more) clock signal is sequentially input to each stage of the shift register circuit, and the sub-gate-on pulse is substantially simultaneously applied to the third TFTs belonging to consecutive q pixel rows (q is an integer of 2 or more), the integer q not having a common divisor other than 1 with respect to the phase number p of the clock signal.

Item 14

In the liquid crystal display apparatus according to Item 7, the gate drive circuit includes a shift register circuit, and a p phase (p is an integer of 2 or more) clock signal is sequentially input to each stage of the shift register circuit, and the sub-gate-on pulse is substantially simultaneously applied to the third TFTs belonging to a plurality of the pixel rows separated from each other by r pixel rows (r is a multiple of p).

Item 15

A method for driving the liquid crystal display apparatus according to any one of Items 1 to 14.

According to an embodiment of the disclosure, a liquid crystal display apparatus that suppresses a deterioration in layout efficiency and has a three-TFT structure and a method for driving the liquid crystal display apparatus are provided.

BRIEF DESCRIPTION OF DRAWINGS

The disclosure will be described with reference to the accompanying drawings, wherein like numbers reference like elements.

DESCRIPTION OF EMBODIMENTS

Hereinafter, liquid crystal display apparatuses according to embodiments of the disclosure will be described with reference to the accompanying drawings. The liquid crystal display apparatuses according to the embodiments of the disclosure are not limited to those exemplified below.

Figure 1:
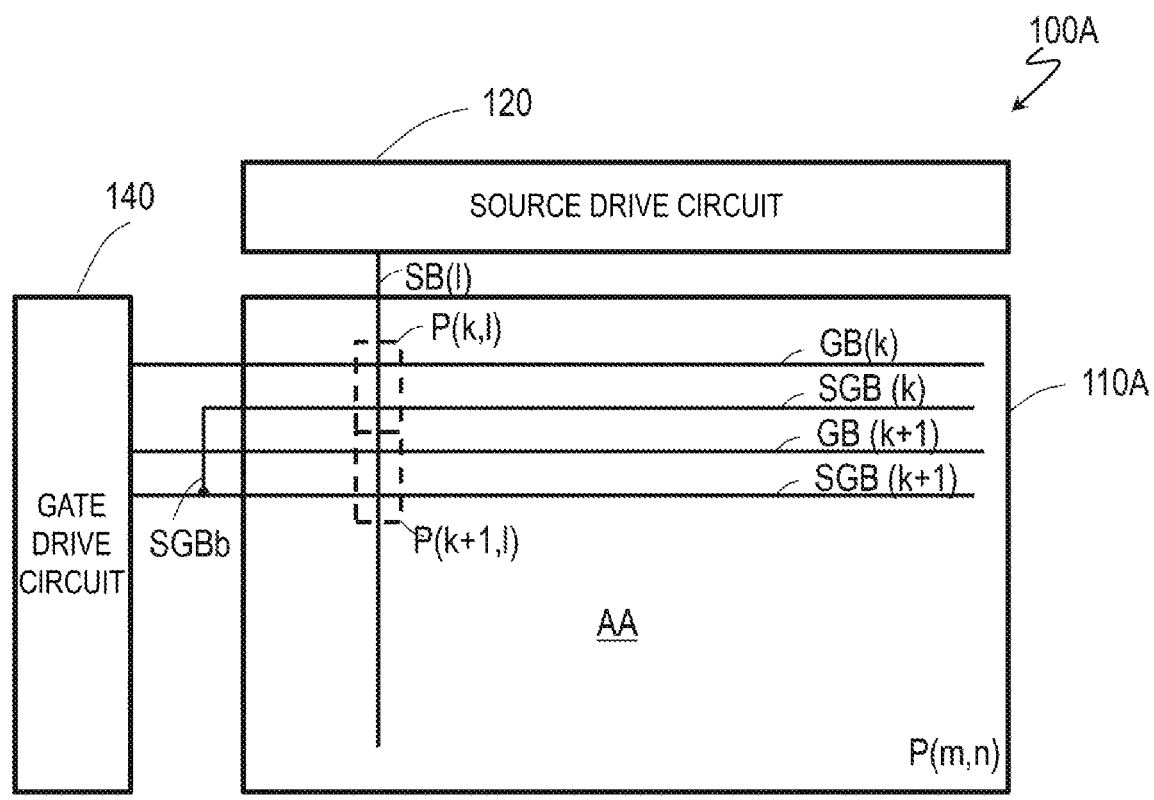
FIG. 1 is a schematic plan view of a liquid crystal display apparatus 100A according to an embodiment of the disclosure.
Figure 2:
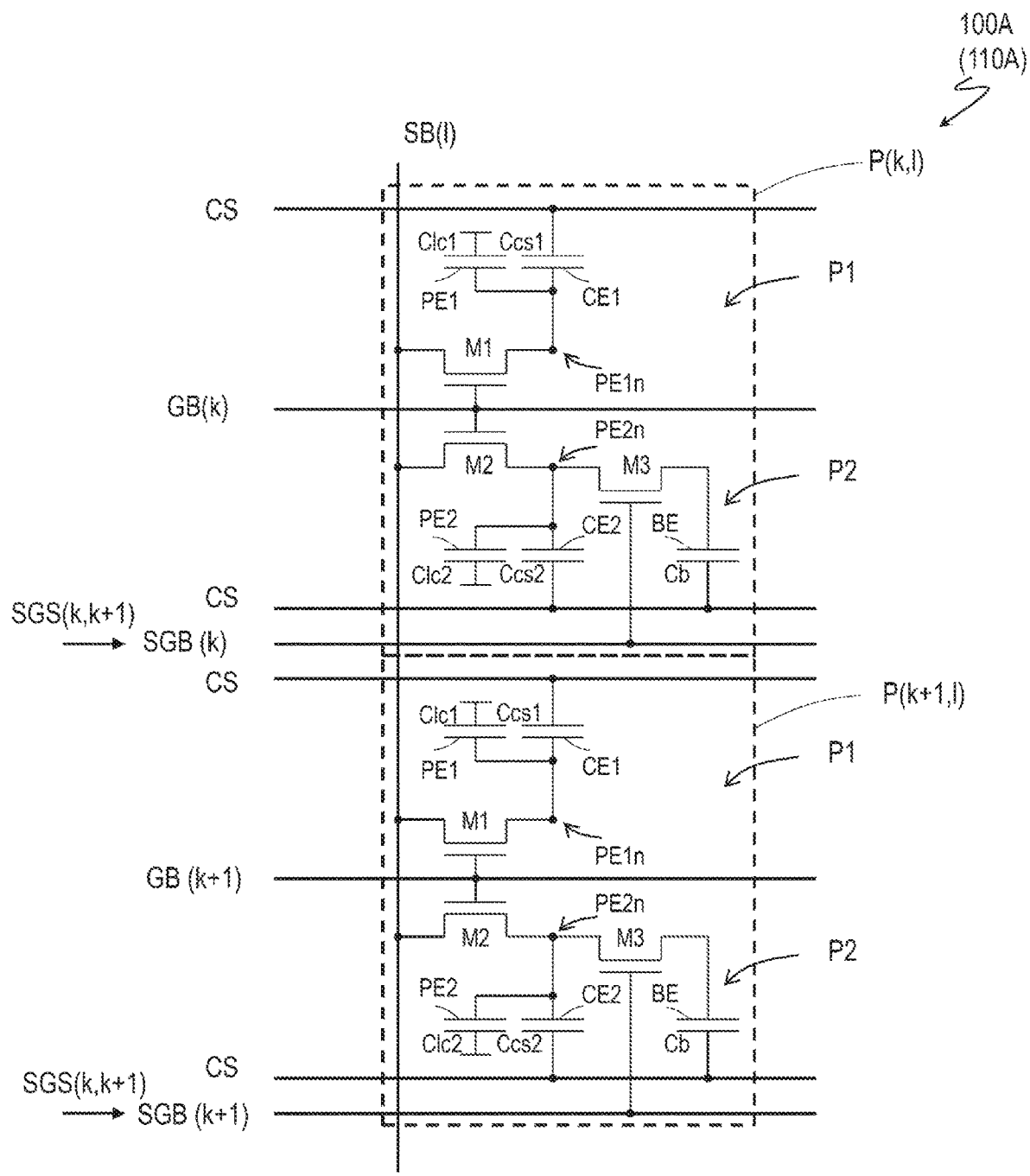
FIG. 2 is a schematic equivalent circuit diagram of two pixels adjacent to each other in a column direction of the liquid crystal display apparatus 100A.
Figure 3:
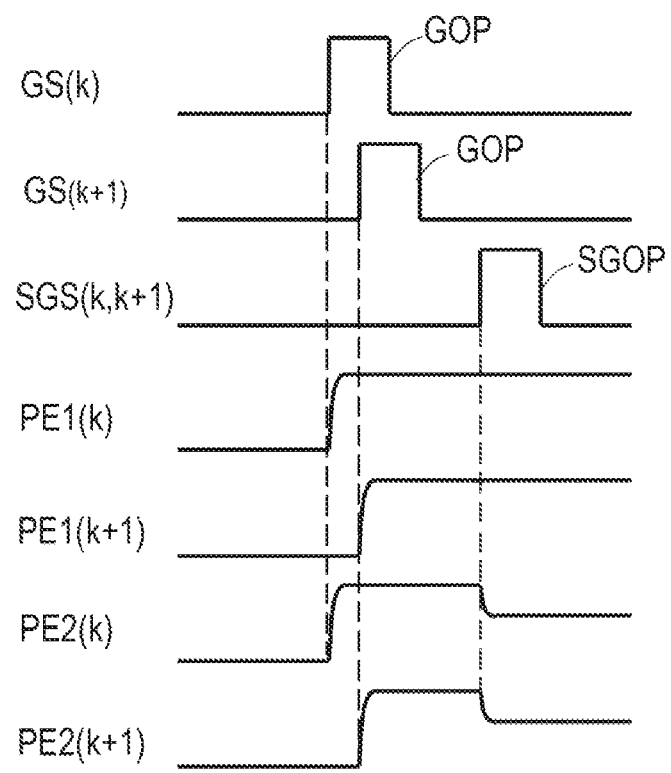
FIG. 3 is a diagram schematically illustrating voltage waveforms of gate scanning signals GS, sub-gate scanning signals SGS, voltages of first pixel electrodes (bright pixel electrodes) PE1, and voltages of second pixel electrodes (dark pixel electrodes) PE2 for driving the two pixels illustrated in FIG. 2.

FIG. 1 illustrates a schematic plan view of a liquid crystal display apparatus 100A according to an embodiment of the disclosure, FIG. 2 illustrates a schematic equivalent circuit diagram of two pixels adjacent to each other in a column direction of the liquid crystal display apparatus 100A, and FIG. 3 schematically illustrates waveforms of gate scanning signals GS, sub-gate scanning signals SGS, voltages of first pixel electrodes (bright pixel electrodes) PE1, and voltages of second pixel electrodes (dark pixel electrodes) PE2 for driving the two pixels illustrated in FIG. 2.

As illustrated in FIG. 1, the liquid crystal display apparatus 100A includes a plurality of pixels P arrayed in a matrix shape including a plurality of pixel rows (m rows) and a plurality of pixel columns (n columns). An area in which the plurality of pixels P are formed is referred to as an active area AA or a display region. The pixel in the k-th row and the l-th column among the pixels arrayed in the m rows and the n columns may be referred to as P(k, l). k, l, m, and n are positive integers that satisfy the relationships of $1 \leq k \leq m$ and $1 \leq l \leq n$. For example, in a liquid crystal display apparatus for so-called 4K television, m is equal to 2160 and n is equal to 3840×3 (when a color display pixel is constituted by an R pixel, a G pixel, and a B pixel, the "pixel" may be referred to as a "dot", and the "color display pixel" constituted by three "dots" may be referred to as a "pixel"). The active area AA is formed in, for example, a liquid crystal cell 110A including two substrates (e.g., glass substrates) disposed so as to face each other with a liquid crystal layer interposed therebetween.

The liquid crystal display apparatus 100A further includes a plurality of gate bus lines GB (m lines), each of which is associated with one of the plurality of pixel rows, a plurality of source bus lines SB (n lines), each of which is associated with one of the plurality of pixel columns, and a plurality of sub-gate bus lines SGB, each of which is associated with one of the plurality of pixel rows. These are formed on one of the substrates of the liquid crystal cell 110A.

As illustrated in FIG. 2, each of the plurality of pixels P includes a first pixel (bright pixel) P1 that displays a gray scale higher than a gray scale to be displayed, and a second pixel (dark pixel) P2 that displays a gray scale lower than the gray scale to be displayed. The first pixel P1 includes a first liquid crystal capacitor Clc1 including the first pixel electrode PE1, a first auxiliary capacitor Ccs1 including a first auxiliary capacitor electrode CE1, and a first TFT M1 including a drain electrode connected to the first pixel electrode PE1 and the first auxiliary capacitor electrode CE1. The potentials of the first pixel electrode PEL and the first auxiliary capacitor electrode CEL are the same as the potential of a node PE1n.

The second pixel P2 includes a second liquid crystal capacitor Clc2 including the second pixel electrode PE2, a second auxiliary capacitor Ccs2 including a second auxiliary capacitor electrode CE2, and a second TFT M2 including a drain electrode connected to the second pixel electrode PE2 and the second auxiliary capacitor electrode CE2. The potentials of the second pixel electrode PE2 and the second auxiliary capacitor electrode CE2 are the same as the potential of a node PE2n. The second pixel P2 further includes a buffer capacitor Cb including a buffer capacitor electrode BE connected to the node PE2n via a third TFT M3.

Electrodes respectively facing the first pixel electrode PE1, the second pixel electrode PE2, the first auxiliary capacitor electrode CE1, the second auxiliary capacitor electrode CE2, and the buffer capacitor electrode BE are electrically connected to a common wiring line CS, and a common voltage (also referred to as a counter voltage) is applied thereto. The waveforms of the voltages of the first pixel electrodes PE1 and the voltages of the second pixel electrodes (dark pixel electrodes) PE2 illustrated in FIG. 3 are illustrated using the common voltage as a reference, and for the sake of simplicity, all of the voltages are illustrated as positive voltages. However, the polarities of the voltages may be opposite from each other between the k-th row and the k+1-th row (dot-reversal or line-reversal). In addition, in frames before and after the frame (vertical scanning period) illustrated in FIG. 3, voltages having the opposite polarity are applied (frame-reversal driving).

Gate electrodes of the first TFT M1 and the second TFT M2 included in each of the pixels P are connected to the gate bus line GB (e.g., GB(k)) associated with a pixel row (e.g., k-th row) including the pixel P, source electrodes of the first TFT M1 and the second TFT M2 included in each of the pixels are connected to the source bus line SB (e.g., SB(l)) associated with a pixel column (e.g., l-th column) including the pixel, and a gate electrode of the third TFT M3 included in each of the pixels is connected to the sub-gate bus line (e.g., SGB(k)) associated with a pixel row (e.g., k-th row) including the pixel.

The liquid crystal display apparatus 100A includes a source drive circuit 120 that supplies a source signal to the plurality of source bus lines SB, and a gate drive circuit 140 that supplies a gate scanning signal GS, including a gate-on pulse GOP that turns on the first TFT M1 and the second TFT M2, to the plurality of gate bus lines GB and that supplies a sub-gate scanning signal SGS, including a sub-gate-on pulse SGOP that turns on the third TFT M3, to the plurality of sub-gate bus lines SGB. Of the two substrates of the liquid crystal cell, the gate drive circuit 140 is formed, for example, on the same substrate as the plurality of gate bus lines GB and the plurality of sub-gate bus lines SGB. Such a structure is also referred to as a gate-on-array (GOA) structure. Of course, the source drive circuit 120 may be formed or mounted on the same substrate as the gate drive circuit 140.

As illustrated in FIG. 3, the gate scanning signal GS is independently supplied to the plurality of gate bus lines GB one by one, and the sub-gate-on pulse SGOP is substantially simultaneously applied to the third TFTs M3 belonging to two pixel rows (e.g., the k-th row and the k+1-th row). For example, as illustrated in FIG. 1, even when a configuration is employed in which a common sub-gate scanning signal SGS is applied to the third TFTs belonging to two pixel rows, a gate delay (delay in SGOP) occurs due to resistance of the wiring lines in the liquid crystal display apparatus 100A and a parasitic capacitance. Thus, in a strict sense, the sub-gate-on pulse SGOP may not be simultaneously applied to the third TFTs M3 belonging to the two pixel rows, which are two lines different from each other. "Substantially simultaneously" means that a difference caused by the gate delay is ignored.

A method for driving the liquid crystal display apparatus 100A and an example of an operation thereof will be described. Although an example in which the sub-gate-on pulse SGOP is substantially simultaneously applied to the third TFTs M3 belonging to two pixel rows (e.g., the k-th row and the k+1-th row) is described here, the sub-gate-on pulse SGOP may be substantially simultaneously applied to the third TFTs M3 belonging to three or more pixel rows (e.g., the k-th row, the k+1-th row, and the k+2-th row). The same applies to liquid crystal display apparatuses 100B, 100C, 140, 140A, 140B, 140C, and 140D, which will be illustrated below as examples.

In each frame (vertical scanning period), the gate-on pulse GOP is sequentially applied to the gate bus lines GB corresponding to all the rows (so-called line-sequential driving). For example, as illustrated in FIG. 3, after the gate-on pulse GOP is applied to the gate bus line GB(k), the gate-on pulse GOP is then applied to the gate bus line GB(k+1).

When the gate-on pulse GOP is applied to the gate bus line GB(k), the first TFT M1 and the second TFT M2 of the pixel P(k, l) are simultaneously turned on, and a display signal voltage (bright pixel display signal voltage) supplied to a common source bus line SB (e.g., SB(l)) is applied to the first pixel electrode PE1 and the second pixel electrode PE2 and rises as indicated by PE1($k$) and PE2($k$) in FIG. 3.

Similarly, when the gate-on pulse GOP is applied to the gate bus line GB(k+1), the first TFT M1 and the second TFT M2 of the pixel P(k+1, l) are simultaneously turned on, and the display signal voltage (bright pixel display signal voltage) supplied to the common source bus line SB (e.g., SB(l)) is applied to the first pixel electrode PE1 and the second pixel electrode PE2 and rises as indicated by PE1($k$+1) and PE2($k$+1) in FIG. 3.

When the first TFT M1 and the second TFT M2 of each of the pixels P(k, l) and P(k+1, l) are turned off, and after a predetermined time period elapses after the fall of the gate-on pulse GOP applied to the gate bus line GB(k+1), when the sub-gate-on pulse SGOP is substantially simultaneously applied to the sub-gate bus lines SGB(k) and SGB(k+1), the third TFTs M3 of the pixels P(k, l) and P(k+1, l) belonging to the two pixel rows (k-th row and k+1-th row) are substantially simultaneously turned on. Then, in each of the pixel P(k, l) and the pixel P(k+1, l), the node PE2n and the buffer capacitor electrode BE are electrically connected to each other, so that the charges accumulated in the second liquid crystal capacitor Clc2 and the second auxiliary capacitor Ccs2 move to the buffer capacitor Cb. As a result, the voltages held by the second liquid crystal capacitor Clc2 and the second auxiliary capacitor Ccs2 decrease, and the second pixel P2 becomes a dark pixel. Since the first liquid crystal capacitor Clc1 and the first auxiliary capacitor Ccs1 of the first pixel P1 continue to hold the display signal voltage (bright pixel display signal voltage), the first pixel SL becomes a bright pixel.

The configuration in which the gate scanning signal GS is independently supplied to the plurality of gate bus lines GB one by one and the sub-gate scanning signal SGS common to the two sub-gate bus lines SGB associated with the two pixel rows is supplied to the plurality of sub-gate bus lines SGB can be realized by, for example, connecting the two sub-gate bus lines SGB to each other by a sub-gate branch line SGBb as illustrated in FIG. 1.

Figure 4:
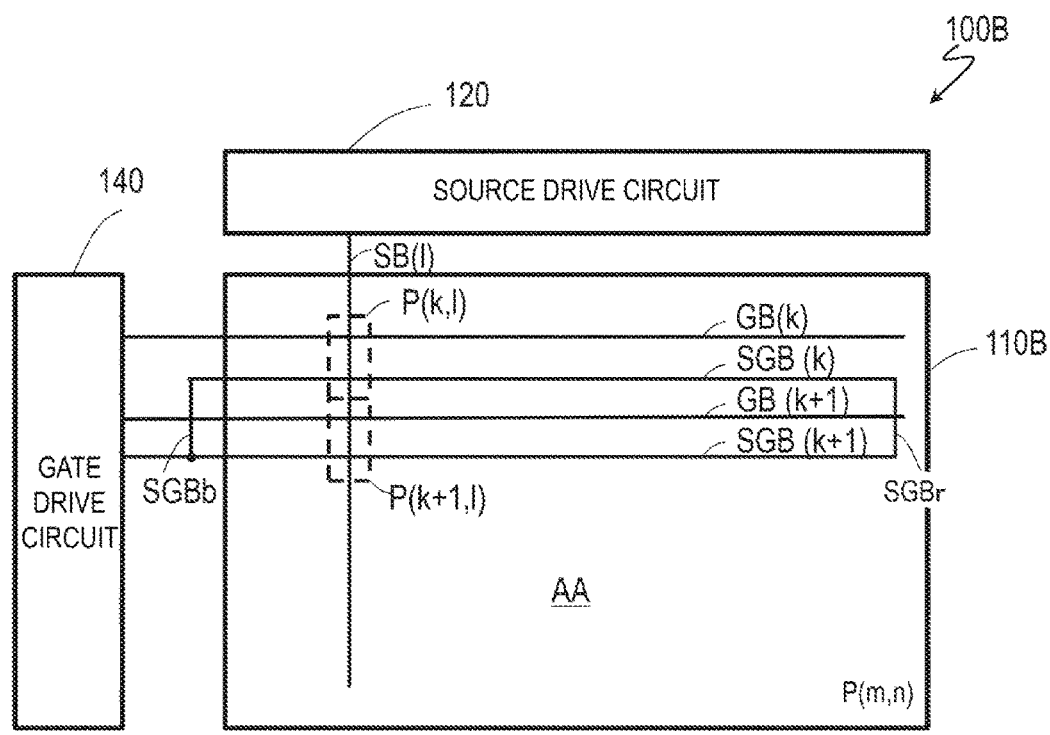
FIG. 4 is a schematic plan view of a liquid crystal display apparatus 100B according to an embodiment of the disclosure.
Figure 5:
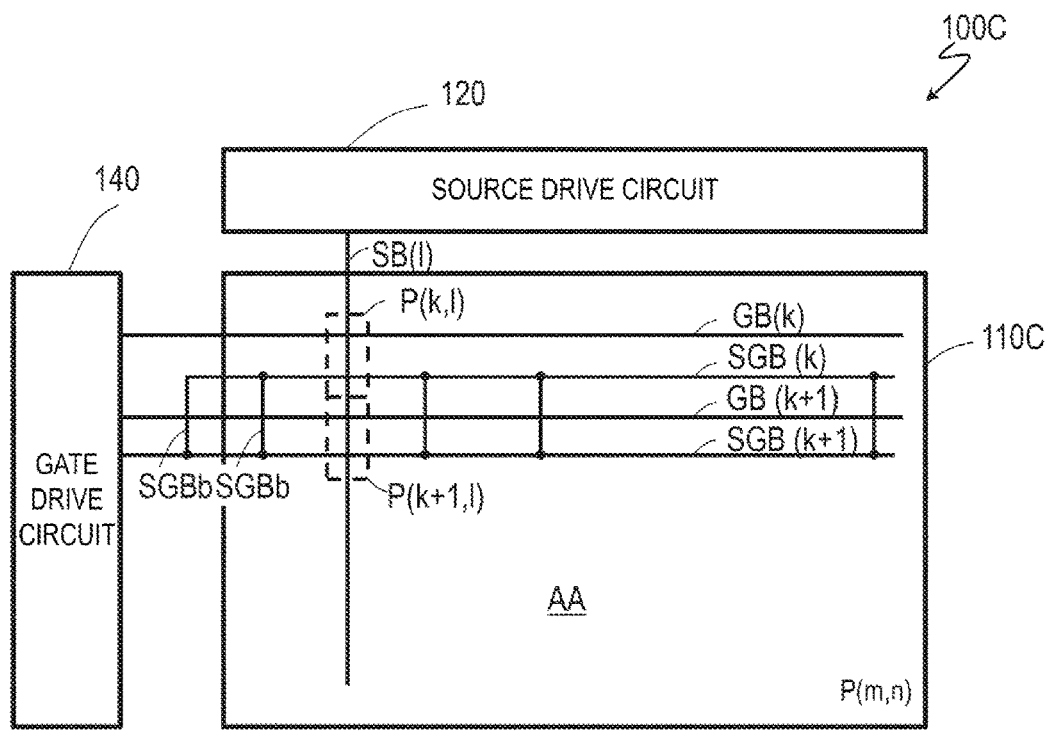
FIG. 5 is a schematic plan view of a liquid crystal display apparatus 100C according to an embodiment of the disclosure.

Alternatively, as in a liquid crystal cell 110B of the liquid crystal display apparatus 100B illustrated in FIG. 4, the two sub-gate bus lines SGB may be connected to each other by the sub-gate branch line SGBb as illustrated in FIG. 1, and further, end portions of the two sub-gate bus lines SGB may be connected to each other by a terminal connection line SGBr to form a loop. Of course, at this time, the sub-gate branch line SGBb may be omitted, and the two sub-gate bus lines SGB may be connected only by the terminal connection line SGBr. Alternatively, the two sub-gate bus lines SGB may be connected to each other by a plurality of the sub-gate branch lines SGBb as in a liquid crystal cell 110C of the liquid crystal display apparatus 100C illustrated in FIG. 5. Of course, the terminal connection line SGBr may also be provided.

By connecting the two sub-gate bus lines SGB to each other at a plurality of locations using the sub-gate branch line SGBb and/or the terminal connection line SGBr, it is possible to suppress an occurrence of display unevenness caused by a difference in delay time of the sub-gate-on pulse SGOP between the two sub-gate bus lines SGB. In addition, even when one of the two sub-gate bus lines SGB is disconnected, the sub-gate scanning signal SGS is supplied from the other sub-gate bus line SGB, and thus, the yield of the liquid crystal display apparatus can be improved. Of course, these advantages can also be obtained when the common sub-gate scanning signal SGS is supplied to three or more of the sub-gate bus lines SGB.

Figure 6:
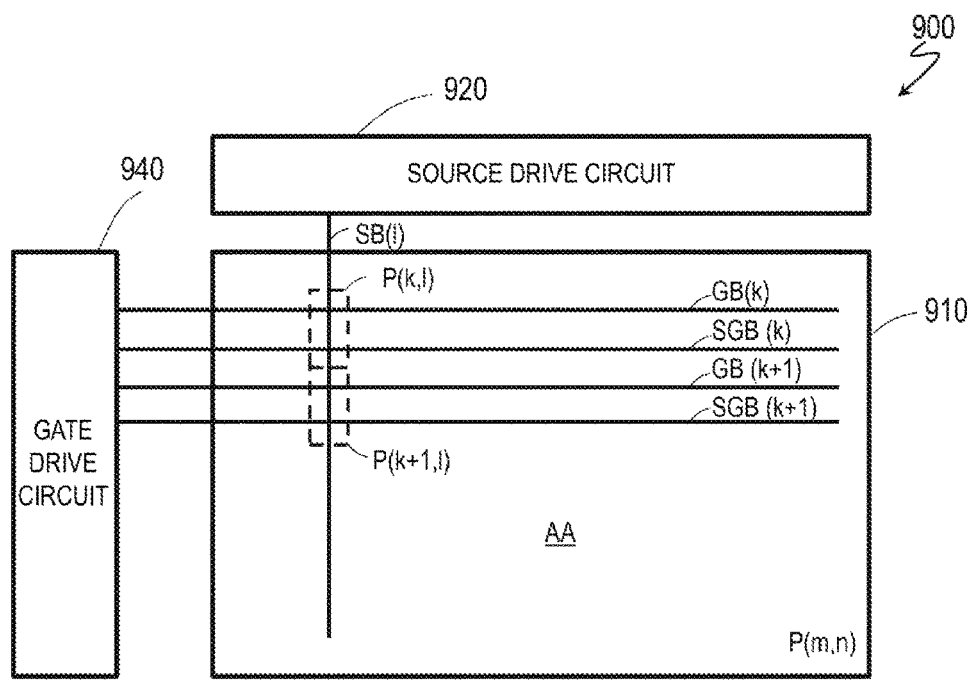
FIG. 6 is a schematic plan view of a known liquid crystal display apparatus 900 having a three-TFT structure.
Figure 7:
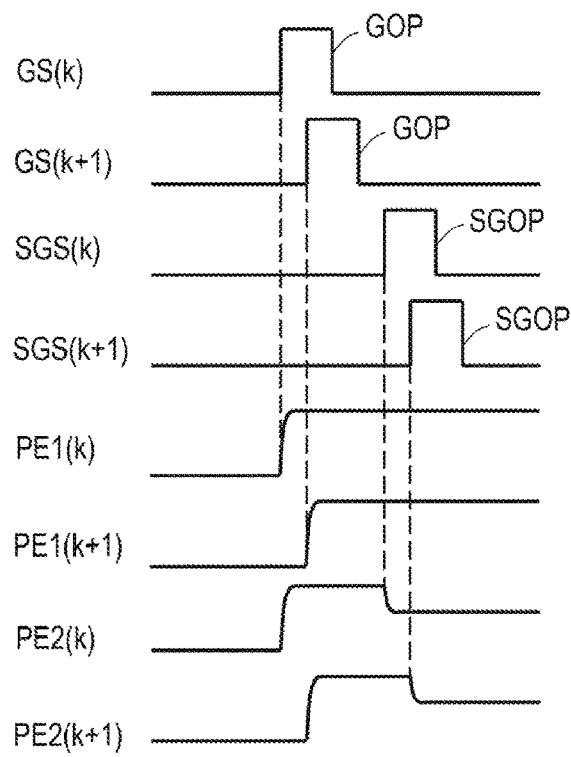
FIG. 7 is a diagram schematically illustrating voltage waveforms of the gate scanning signals GS, the sub-gate scanning signals SGS, voltages of the first pixel electrodes PE1, and voltages of the second pixel electrodes PE2 for driving two pixels adjacent to each other in a column direction of the liquid crystal display apparatus 900.

For comparison, FIG. 6 illustrates a schematic plan view of a known liquid crystal display apparatus 900 having a three-TFT structure, and FIG. 7 schematically illustrates voltage waveforms of the gate scanning signals GS, the sub-gate scanning signals SGS, the voltages of the first pixel electrodes (bright pixel electrodes) PE1, and the voltages of the second pixel electrodes (dark pixel electrodes) PE2 for driving two pixels adjacent to each other in a column direction of the liquid crystal display apparatus 900 illustrated in FIG. 6. The liquid crystal display apparatus 900 includes a liquid crystal cell 910 having the active area AA including a plurality of pixels, a source drive circuit 920, and a gate drive circuit 940.

In the liquid crystal cell 910 of the liquid crystal display apparatus 900, the gate scanning signal GS is independently supplied to the plurality of gate bus lines GB one by one, and the sub-gate scanning signal SGS is also independently supplied to the plurality of sub-gate bus lines SGB one by one. Therefore, the voltages of the second pixel electrodes PE2 in each pixel row decreases after the sub-gate-on pulse SGOP is independently supplied from the corresponding sub-gate bus line SGB.

The number of outputs of the sub-gate scanning signal SGS of the gate drive circuit 140 in the liquid crystal display apparatuses 100A to 100C according to the above-described embodiments is half the number of outputs of the sub-gate scanning signal SGS of the gate drive circuit 940 in the liquid crystal display apparatus 900. Therefore, the structure of the gate drive circuit 140 can be made simpler than the structure of the gate drive circuit 940. When the GOA structure is employed, there are particularly significant advantages, namely, an improvement in layout efficiency and a cost reduction, due to the reduction of gate signal generation circuits and lead-out wiring lines.

Figure 8:
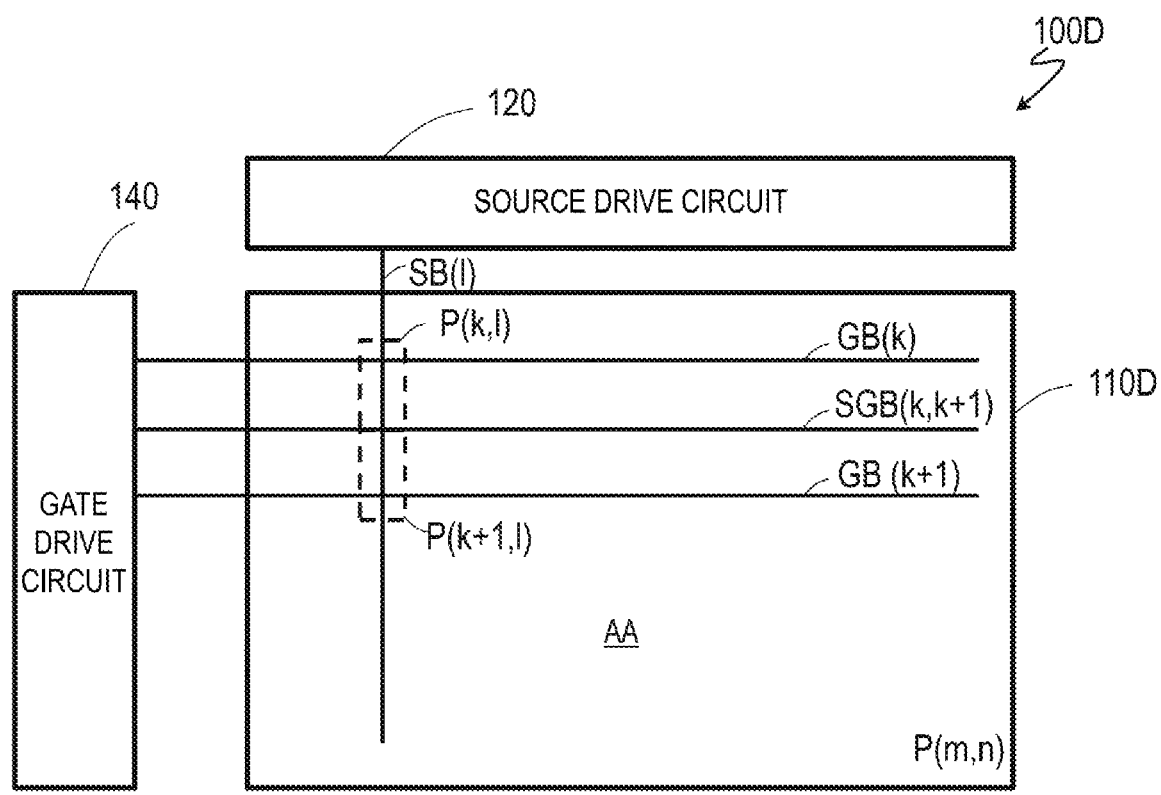
FIG. 8 is a schematic plan view of a liquid crystal display apparatus 100D according to an embodiment of the disclosure.
Figure 9:
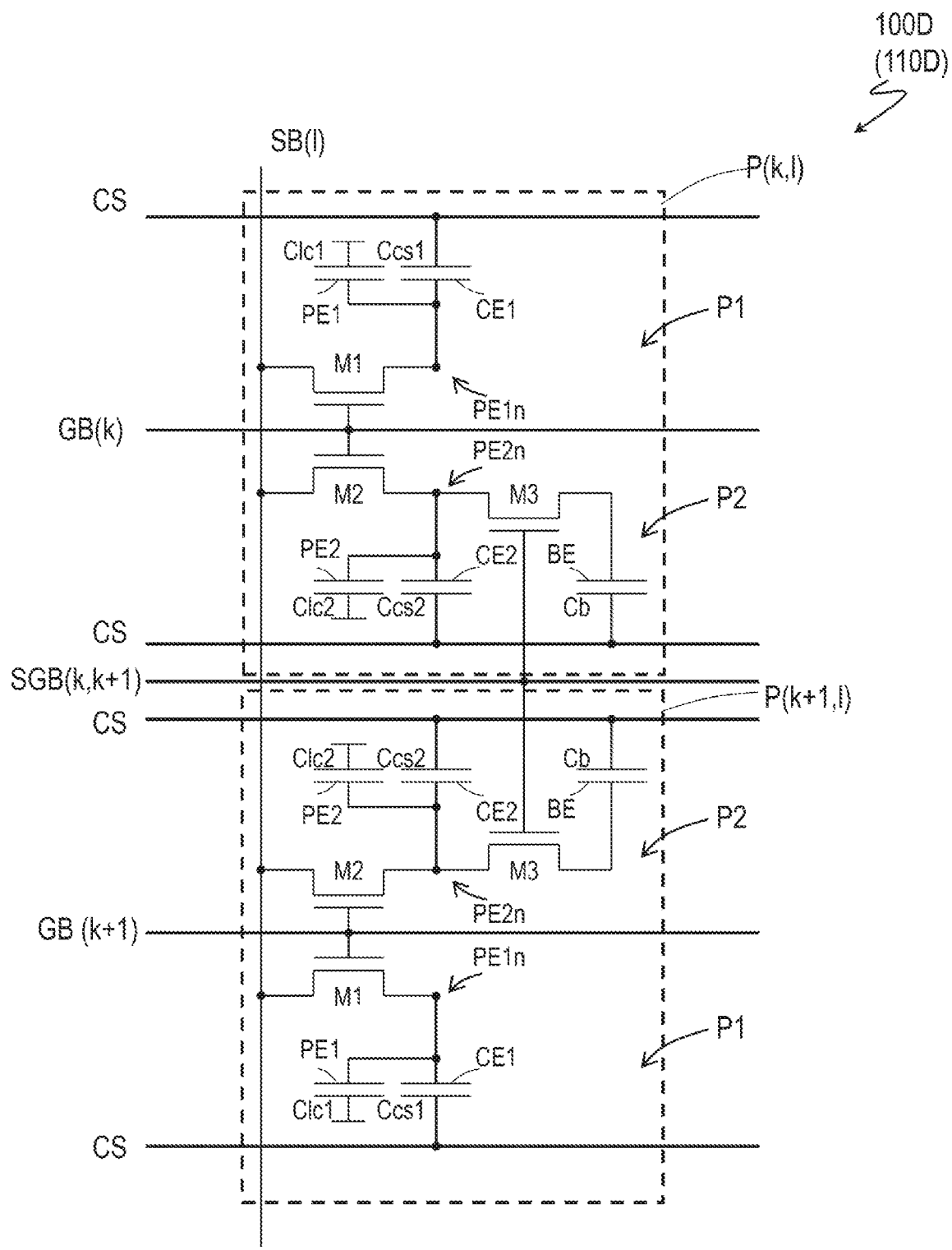
FIG. 9 is a schematic equivalent circuit diagram of two pixels adjacent to each other in a column direction of the liquid crystal display apparatus 100D.

Further, when a structure of the liquid crystal display apparatus 100D illustrated in FIGS. 8 and 9 is employed, the number of the sub-gate bus lines SGB in the active area AA can be reduced by half. FIG. 8 is a schematic plan view of the liquid crystal display apparatus 100D according to an embodiment of the disclosure, and FIG. 9 is a schematic equivalent circuit diagram of two pixels adjacent to each other in a column direction of the liquid crystal display apparatus 100D.

In the liquid crystal display apparatus 100D, the third TFTs M3 belonging to two pixel rows (e.g., the k-th row and the k+1-th row) adjacent to each other are connected to the common sub-gate bus line SGB (e.g., SGB (k, k+1)), and the second pixel electrodes PE2 of one pixel belonging to one of the pixel rows of the two pixel rows and the second pixel electrodes PE2 of a pixel belonging to the other of the pixel rows and in the same column as the one pixel are arranged so as to be adjacent to each other via the common sub-gate bus line SGB in a plan view. The array of the first pixel (bright pixel) P1 and the second pixel (dark pixel) P2 in the column direction in the liquid crystal display apparatus 100D is, for example, as illustrated in FIG. 9, namely, the pixel P(k, 1)→the pixel P (k+1, 1), and the first pixel (bright pixel) P1→the second pixel (dark pixel) P2→the second pixel (dark pixel) P2→the first pixel (bright pixel) P1. In other words, the order of the first pixel (bright pixel) P1 and the second pixel (dark pixel) P2 is reversed every pixel row. In contrast, the array of the first pixel (bright pixel) P1 and the second pixel (dark pixel) P2 in the liquid crystal display apparatus 100A illustrated in FIG. 2 is the pixel P(k, 1)→the pixel P(k+1, 1) and the first pixel (bright pixel) P1→the second pixel (dark pixel) P2→the first pixel (bright pixel) P1→the second pixel (dark pixel) P2. In the liquid crystal display apparatus 100D, the second pixel (dark pixel) P2 (the second pixel electrode PE2) of the pixel (e.g., the pixel P(k, 1)) belonging to one of the pixel rows of the two pixel rows including the common sub-gate bus line SGB (e.g., SGB (k, k+1)) is located closer to a side of the other of the pixel rows (i.e., the common sub-gate bus line SGB side) than the first pixel (bright pixel) P1 (the first pixel electrode PE1), and the second pixel (dark pixel) P2 (the second pixel electrode PE2) of the pixel (e.g., the pixel P (k+1, 1)) belonging to the other of the pixel rows is located closer to a side of the one pixel row (i.e., the common sub-gate bus line SGB side) than the first pixel (bright pixel) P1 (the first pixel electrode PE1).

Next, an example of a gate drive circuit having the GOA structure will be described with reference to FIGS. 10 to 13.

Figure 10:
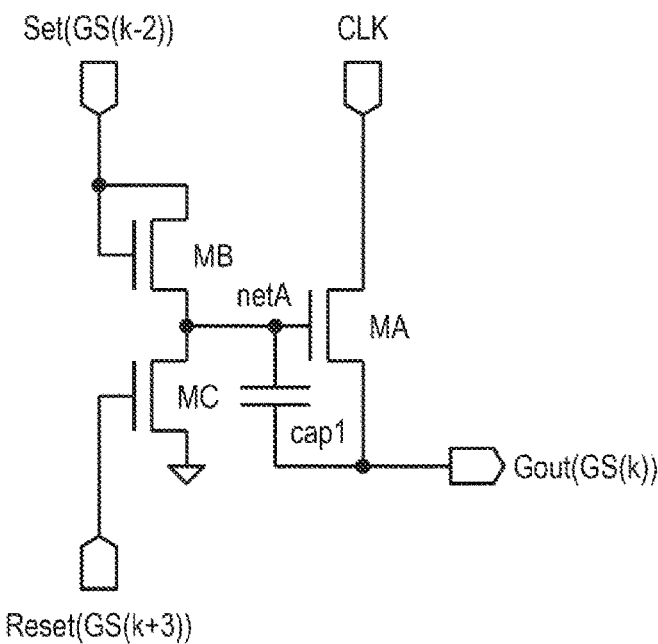
FIG. 10 is a schematic circuit diagram of one stage of a shift register circuit SR.
Figure 11:
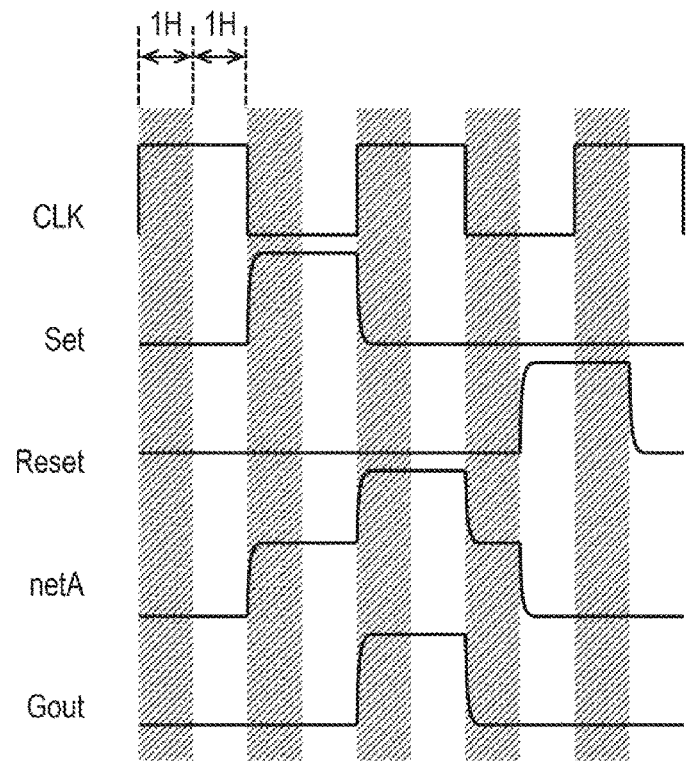
FIG. 11 is a schematic waveform diagram illustrating the potentials of each signal and an internal node netA in FIG. 10.
Figure 12:
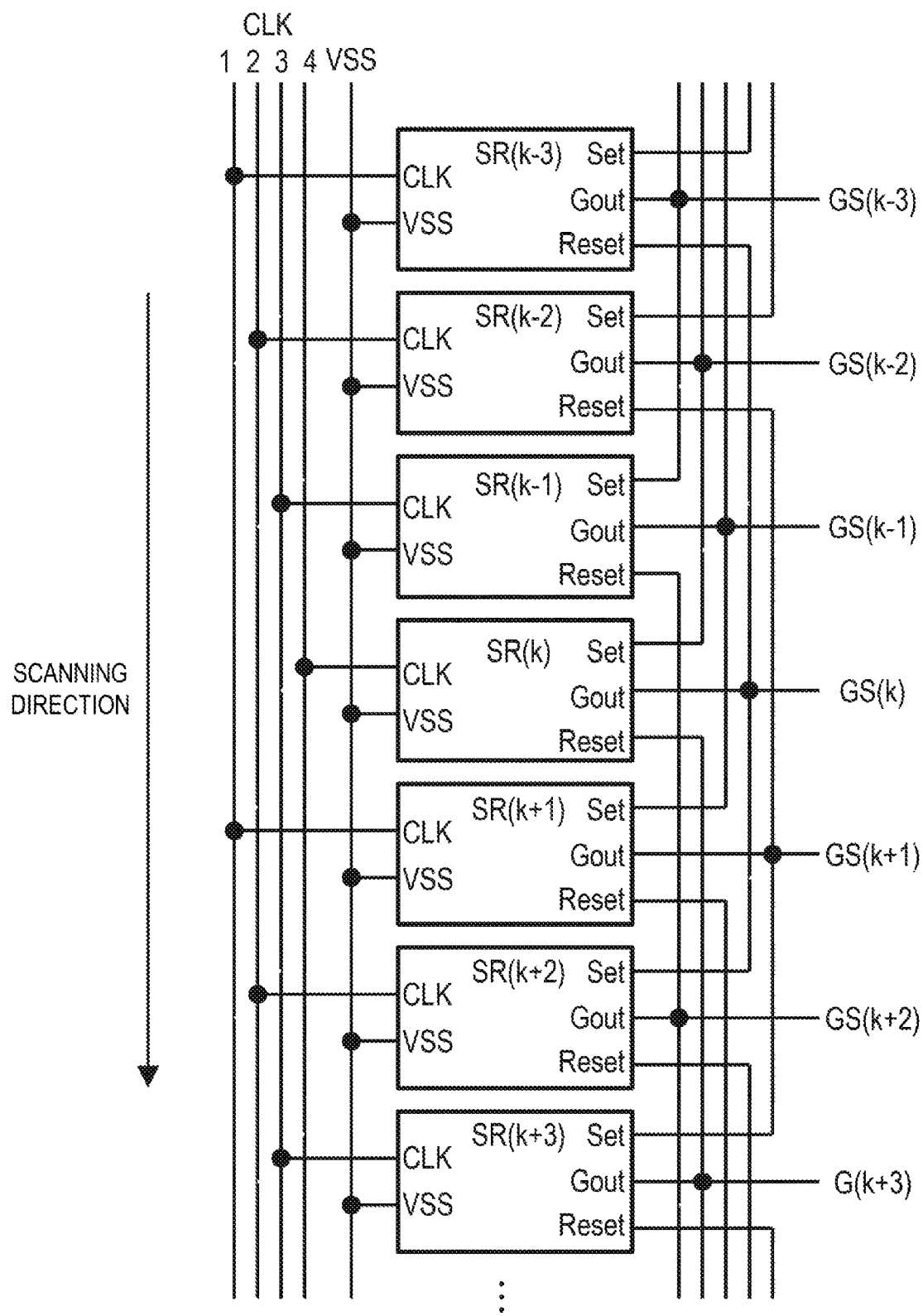
FIG. 12 is a schematic diagram illustrating a circuit configuration for outputting the gate scanning signals GS.
Figure 13:
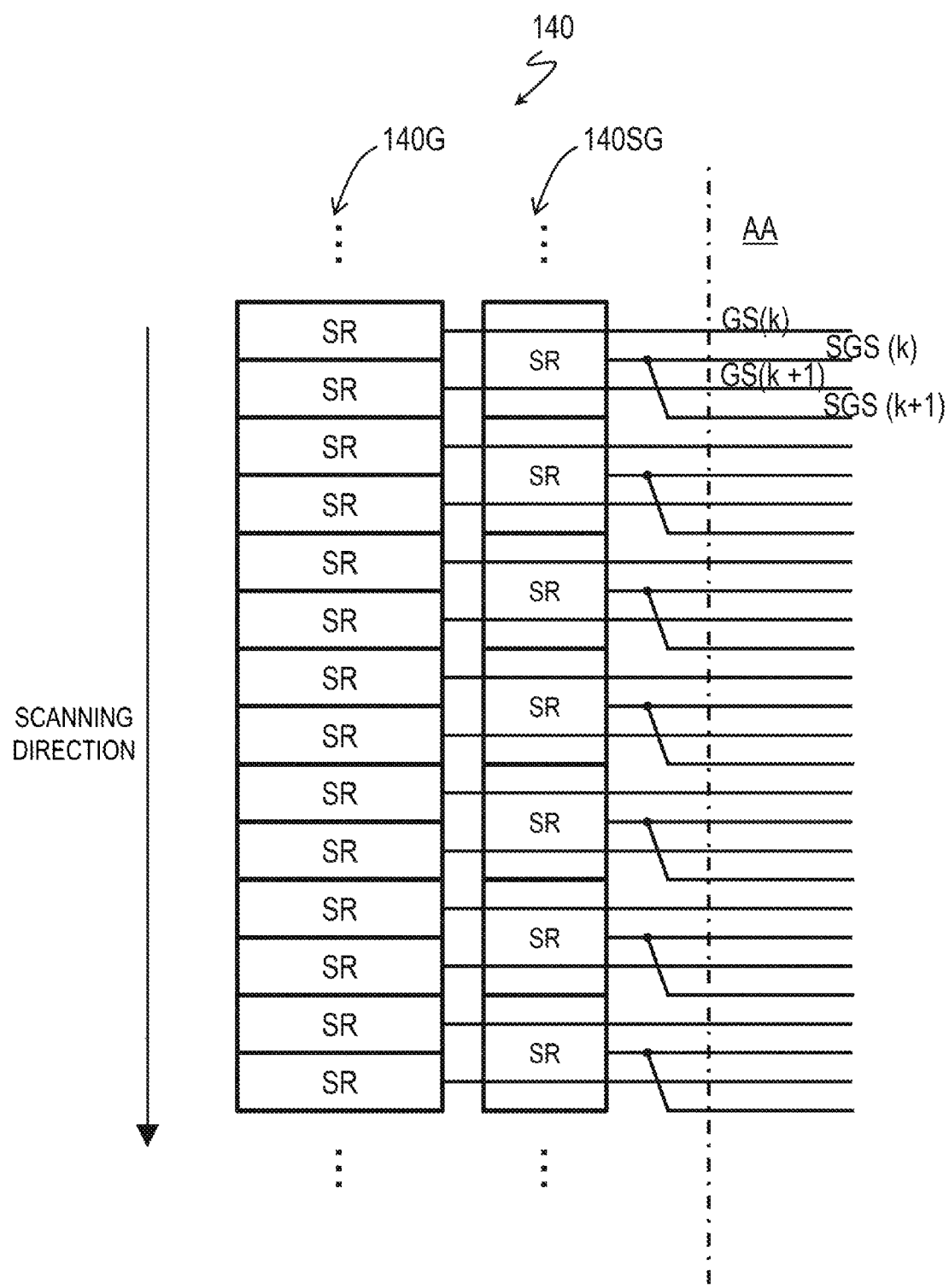
FIG. 13 is a schematic diagram illustrating a circuit configuration of a gate drive circuit 140 constituted by the shift register circuits SR.

In general, a gate drive circuit having the GOA structure is constituted by shift register circuits SR, as illustrated in FIGS. 10 to 13. FIG. 10 is a schematic circuit diagram of one stage of the shift register circuit SR, FIG. 11 is a schematic waveform diagram illustrating the potentials of each signal and an internal node netA in FIG. 10, FIG. 12 is a schematic diagram illustrating a circuit configuration for outputting the gate scanning signal GS (GS(k)), and FIG. 13 is a schematic diagram illustrating a circuit configuration of the gate drive circuit 140 constituted by the shift register circuits SR.

Reference will now be made to FIG. 10. A clock signal CLK, a reference voltage signal Vss, a Set signal, and a Reset signal are input to each stage of the shift register circuit SR. Signals generated at other stages are used as the Set signal and the Reset signal. A circuit at each stage of the shift register circuit SR includes a transistor MA that outputs the gate scanning signal GS (Gout(GS(k))) from a power supply node (CLK) in accordance with the voltage level of the internal node netA, a transistor MB that boosts the voltage of the internal node netA using the Set signal, which is Gout of the previous stage (GS(k−x)), by x (x is a positive integer and x=2 in this case) from that of the current stage, a capacitor cap1 that holds the voltage of the internal node netA boosted by the transistor MB, and a transistor MC that lowers the voltage of the internal node netA using the Reset signal, which is Gout of the subsequent stage (GS(k+y)), by y (y is a positive integer and y=3 in this case) from that of the current stage. 1H in FIG. 11 represents one horizontal scanning period.

A circuit that generates the sub-gate scanning signals SGS is also constituted by the shift register circuits. In the example illustrated in FIG. 13, the gate drive circuit 140 includes a circuit 140G that outputs the gate scanning signal GS(k) to the gate bus line (GB(k)), and a circuit 140SG that outputs the sub-gate scanning signal SGS(k) to the sub-gate bus line (SGB(k)).

The number of sub-gate scanning signals SGS output from the gate drive circuit 140 of the above-described embodiment can be made smaller than the number of gate scanning signals GS. Therefore, as illustrated in FIG. 13, the number of stages of the circuit 140SG that outputs the sub-gate scanning signals SGS is smaller than the number of stages of the circuit 140G that outputs the gate scanning signals GS.

Next, an example of the gate drive circuit 140 including the shift register circuits that output both the gate scanning signal GS and the sub-gate scanning signal SGS will be described with reference to FIGS. 14 to 19.

Figure 14:
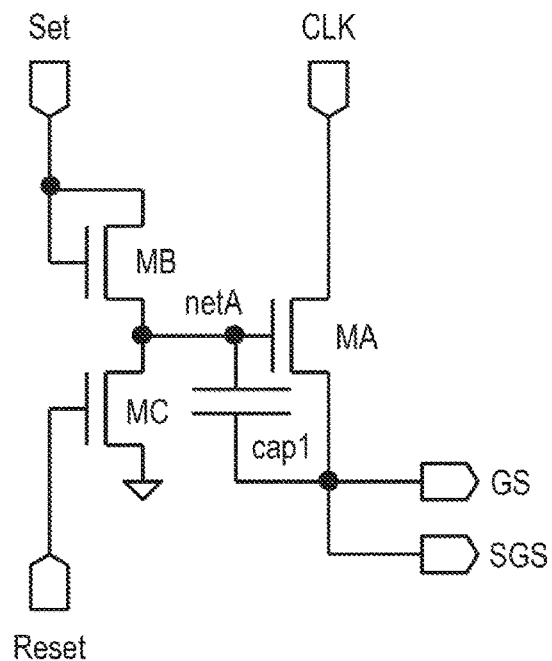
FIG. 14 is a schematic circuit diagram of one stage of the shift register circuit SR that outputs the gate scanning signal GS and the sub-gate scanning signal SGS.
Figure 15:
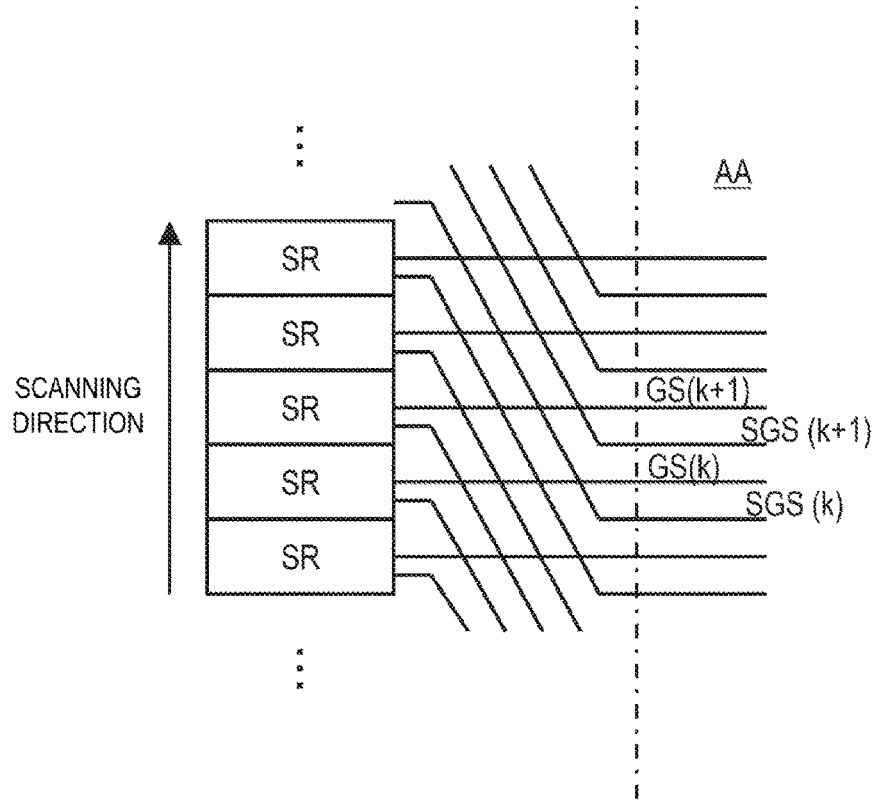
FIG. 15 is a schematic diagram illustrating a circuit configuration of a gate drive circuit 140A constituted by the shift register circuits SR.

FIG. 14 is a schematic circuit diagram of one stage of the shift register circuit SR that outputs the gate scanning signal GS and the sub-gate scanning signal SGS, and FIG. 15 is a schematic diagram illustrating a circuit configuration of a gate drive circuit 140A constituted by the shift register circuits SR illustrated in FIG. 14.

For example, as in the gate drive circuit illustrated in FIGS. 14 and 15, it is conceivable to simplify the structure of the gate drive circuit by using the gate scanning signal GS of a certain stage as the sub-gate scanning signal SGS of a stage preceding the certain stage. In other words, the shift register circuits constituting the gate drive circuit has a stage that outputs both the gate scanning signal GS and the sub-gate scanning signal SGS.

Figure 16:
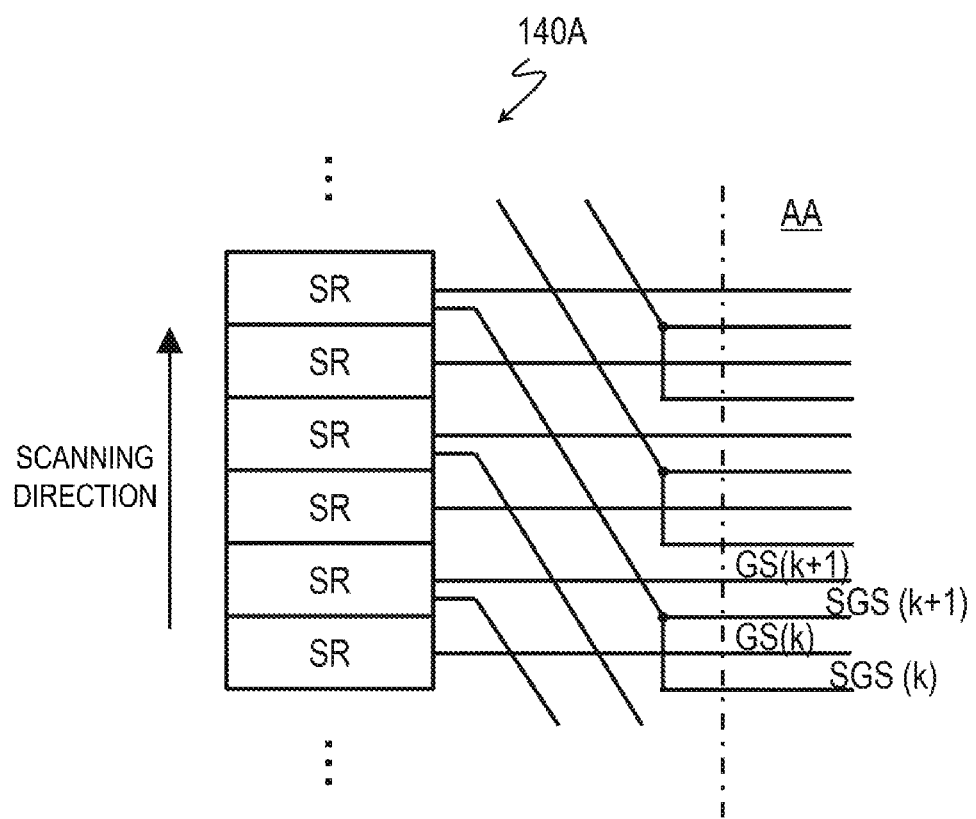
FIG. 16 is a diagram schematically illustrating a configuration of the gate drive circuit 140A that can be included in a liquid crystal display apparatus according to an embodiment of the disclosure.
Figure 17:
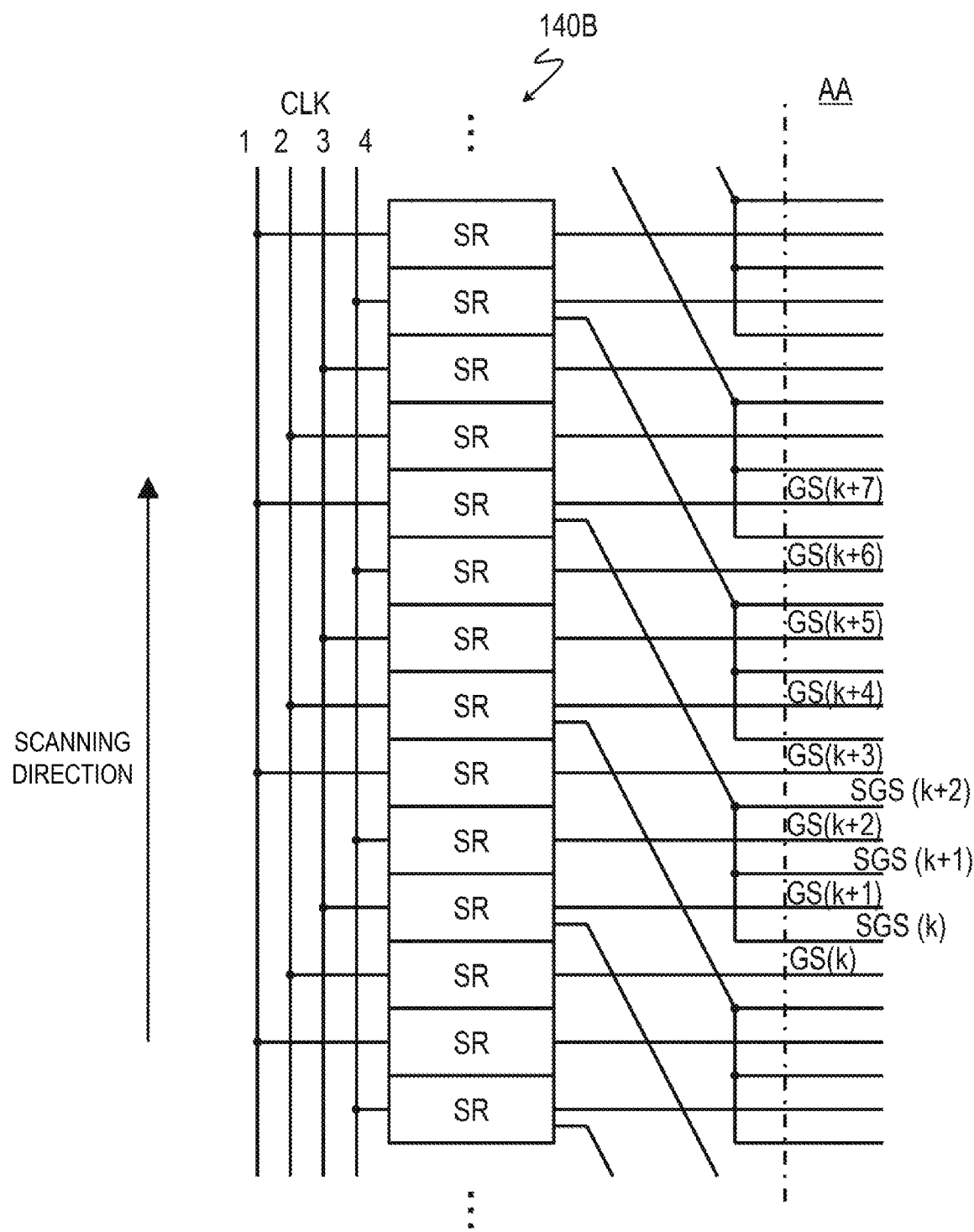
FIG. 17 is a diagram schematically illustrating a configuration of a gate drive circuit 140B that can be included in a liquid crystal display apparatus according to an embodiment of the disclosure.

FIG. 16 schematically illustrates another configuration of the gate drive circuit 140A that can be included in a liquid crystal display apparatus according to an embodiment of the disclosure. In the gate drive circuit 140A, the gate scanning signal GS of a certain stage is used as the sub-gate scanning signal SGS of two stages preceding the certain stage. As a result, as illustrated in FIG. 16, it is possible to reduce the number of lead-out wiring lines for the sub-gate scanning signals SGS, and to improve the yield and the layout efficiency by increasing the space between the wiring lines.

In the gate drive circuit 140A illustrated in FIG. 16, the shift register circuits SR that output the sub-gate scanning signal SGS, and the shift register circuits SR that do not output the sub-gate scanning signal SGS are provided in a mixed manner, and thus, loads of the gate wiring lines (the gate bus lines GB and the sub-gate bus lines SGB) connected to the respective stages become different from each other. By adjusting the drive capability of the transistor MA in accordance with the loads so as to equalize the output waveforms of the respective stages, the display quality can be improved.

Since the drive capability of a transistor is generally proportional to channel width W/channel length L (hereinafter referred to as W/L) of the transistor, W/L of the transistor MA may be adjusted so as to be proportional to the total capacitance value of the gate bus line GB and the sub-gate bus line SGB connected to a source electrode of the transistor MA at each stage.

Further, by making the numbers of the sub-gate scanning signals SGS driven by the respective clock signals CLK substantially equal to each other, it is possible to reduce a difference in loads caused by a difference in the clock signals CLK. For example, as in the gate drive circuit 140B illustrated in FIG. 17, a configuration may be adopted in which four (p: p is an integer of 2 or more) phase clock signals CLK1 to 4 (CLK1 to p) are sequentially input to each stage of the shift register circuit SR, and the sub-gate-on pulse SGOP is substantially simultaneously applied to the third TFTs belonging to three (q: an integer of 2 or more) consecutive pixel rows, the integer q having no common divisor other than 1 with respect to the phase number 4 (p) of the clock signal CLK (the common sub-gate scanning signal SGS is supplied to the q consecutive pixel rows). At this time, the sub-gate scanning signal SGS is output every q stages. However, since p and q do not have a common divisor other than 1, it is possible to inhibit the shift register circuit SR, which outputs the sub-gate scanning signal SGS, from being connected to a specific clock signal CLK in a biased manner.

Figure 18:
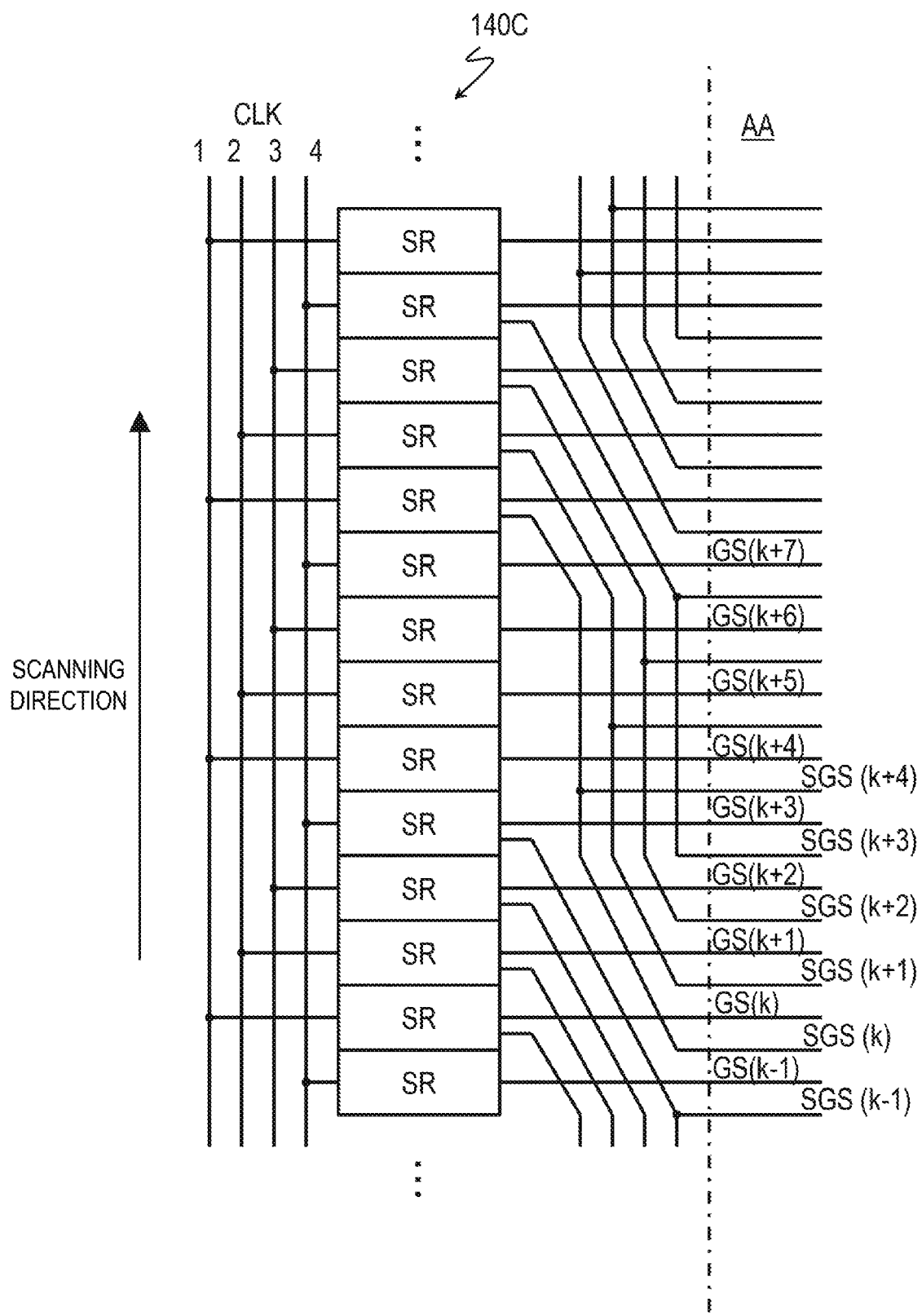
FIG. 18 is a diagram schematically illustrating a configuration of a gate drive circuit 140C that can be included in a liquid crystal display apparatus according to an embodiment of the disclosure.

Alternatively, as in the gate drive circuit 140C illustrated in FIG. 18, the four phase clock signals CLK1 to 4 (CLK1 to p) (p: p is an integer of 2 or more) are sequentially input to each stage of the shift register circuit SR, and the sub-gate-on pulse SGOP is substantially simultaneously applied to the third TFTs belonging to a plurality of pixel rows separated from each other by r pixel rows (r is a multiple of p, where r=4) (the common sub-gate scanning signal SGS is supplied to the plurality of pixel rows separated from each other by r pixel rows). Since the sub-gate scanning signals SGS that are originally driven by the same clock signal CLK (e.g., the sub-gate scanning signals output to SGB(k) and SGB (k+4)) are grouped together, the signals can be grouped together without losing the balance between the clock signals CLK.

The configuration in which the sub-gate-on pulse is substantially simultaneously applied to the third TFTs belonging to at least two pixel rows may be applied to only a part of the gate drive circuit.

Figure 19:
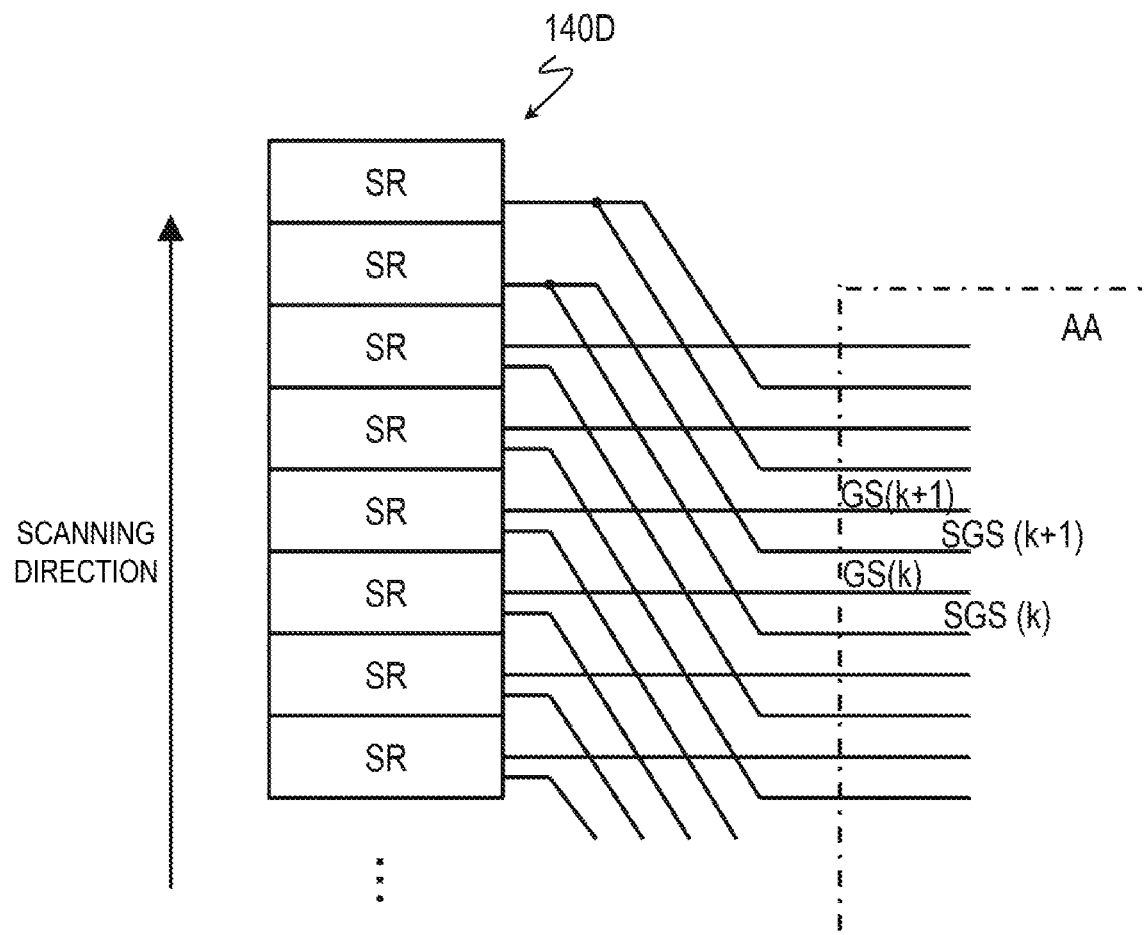
FIG. 19 is a diagram schematically illustrating a configuration of a gate drive circuit 140D that can be included in a liquid crystal display apparatus according to an embodiment of the disclosure.

For example, as in the gate drive circuit 140D illustrated in FIG. 19, by applying the configuration in which the sub-gate-on pulse is substantially simultaneously applied to the third TFTs belonging to at least two pixel rows, to a scanning end terminal section at which the gate scanning signal GS is not required to be output but only the sub-gate scanning signal SGS is required to be output, the number of circuits required for outputting the sub-gate scanning signals SGS can be reduced. In the gate drive circuit 140D illustrated in FIG. 19, a configuration is adopted in which the sub-gate scanning signal SGS output from a stage outputting both the gate scanning signal GS and the sub-gate scanning signal SGS is supplied to one of the sub-gate bus lines SGB, and the sub-gate scanning signal SGS output from a stage outputting only the sub-gate scanning signal SGS is supplied to at least two of the sub-gate bus lines SGB associated with at least two pixel rows. By adopting such a configuration, the loads of the gate wiring lines on the transistor MA can be made uniform.

Figure 20:
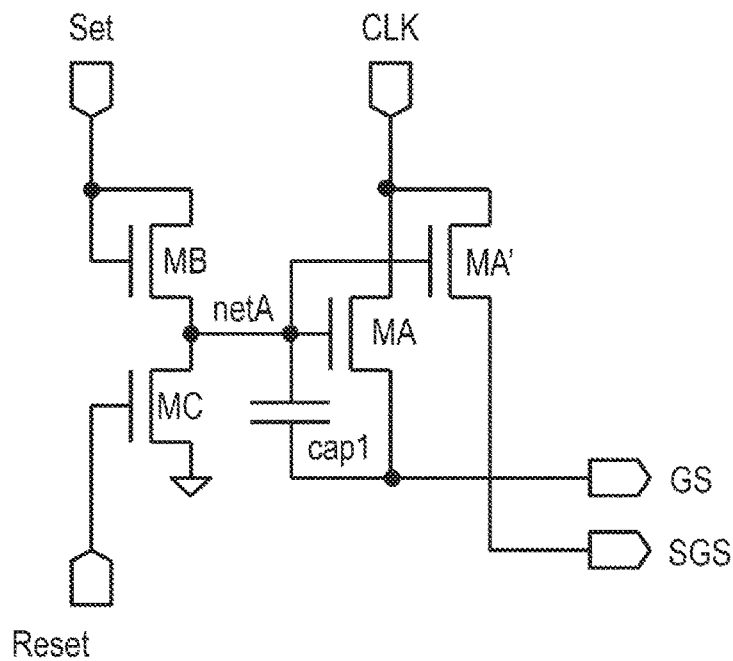
FIG. 20 is a schematic circuit diagram of one stage of another shift register circuit SR used in a gate drive circuit that can be included in a liquid crystal display apparatus according to an embodiment of the disclosure.
Figure 21:
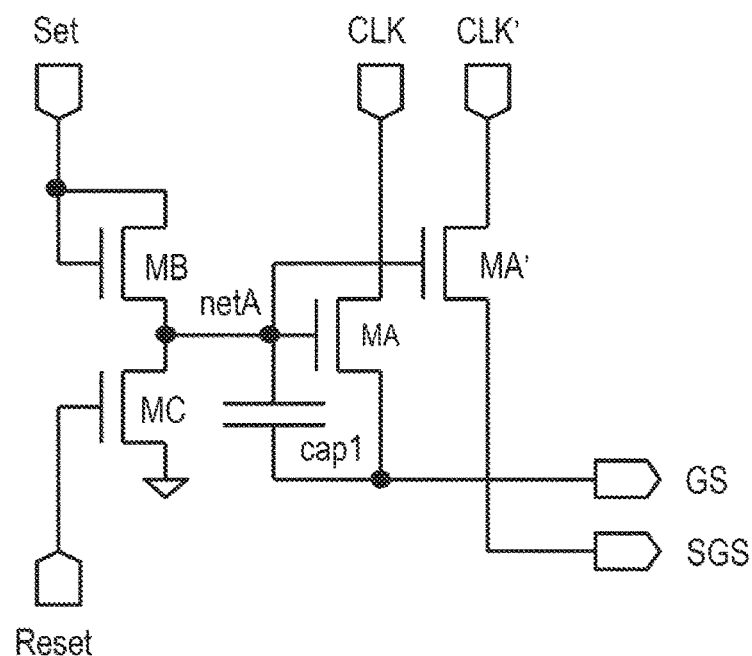
FIG. 21 is a schematic circuit diagram of one stage of yet another shift register circuit SR used in a gate drive circuit that can be included in a liquid crystal display apparatus according to an embodiment of the disclosure.
Figure 22:
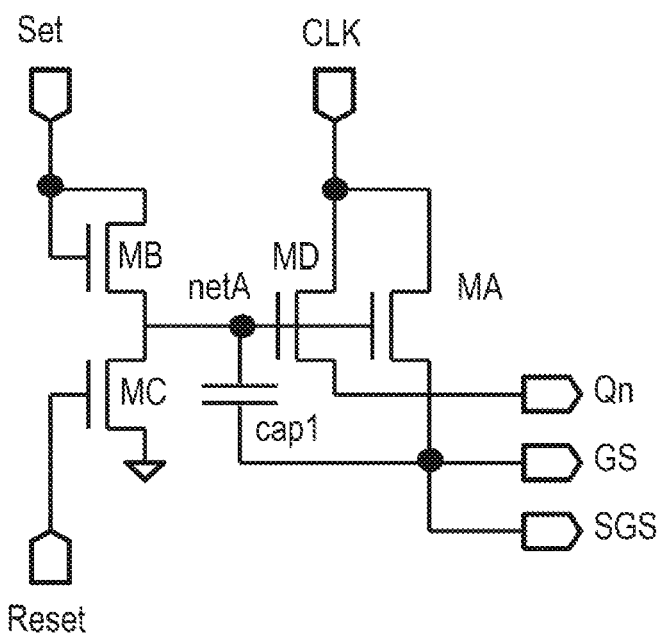
FIG. 22 is a schematic circuit diagram of one stage of yet another shift register circuit SR used in a gate drive circuit that can be included in a liquid crystal display apparatus according to an embodiment of the disclosure.
Figure 23:
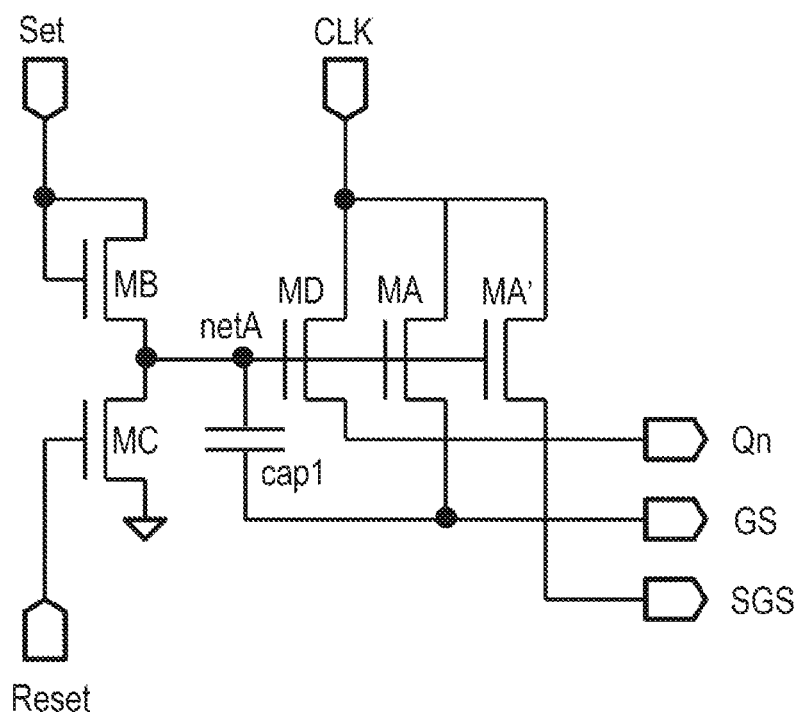
FIG. 23 is a schematic circuit diagram of one stage of yet another shift register circuit SR used in a gate drive circuit that can be included in a liquid crystal display apparatus according to an embodiment of the disclosure.
Figure 24:
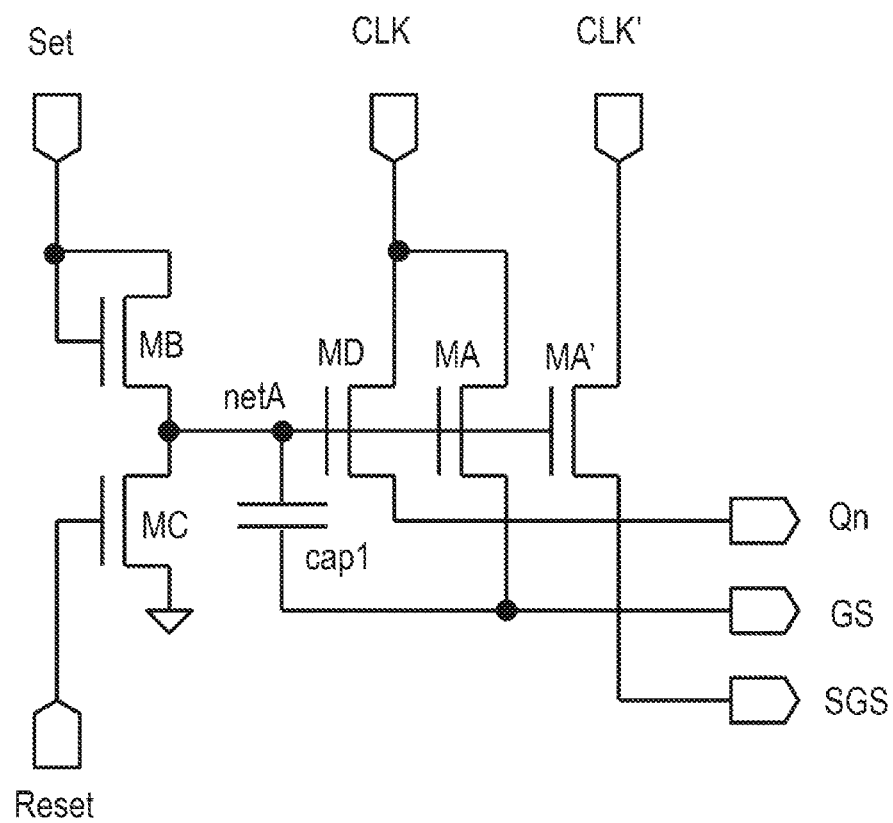
FIG. 24 is a schematic circuit diagram of one stage of yet another shift register circuit SR used in a gate drive circuit that can be included in a liquid crystal display apparatus according to an embodiment of the disclosure.

Further, as illustrated in FIGS. 20 and 21, at each stage of the shift register circuit SR, a structure for outputting the sub-gate scanning signal SGS may be provided separately from a structure for outputting the gate scanning signal GS. In other words, at each stage of the shift register circuit SR, an output transistor MA' for outputting the sub-gate scanning signal SGS may be provided separately from the output transistor MA for outputting the gate scanning signal GS. At this time, the output transistor MA and the output transistor MA' may be connected to a common clock signal input terminal as illustrated in FIG. 20, or may be connected to different clock signal input terminals as illustrated in FIG. 21. By using the shift register circuit having such a structure, it becomes unnecessary to directly connect the gate bus line GB and the sub-gate bus line SGB. As a result, for example, when a failure (e.g., disconnection) occurs in the gate bus line GB or the sub-gate bus line SGB, the range affected by the failure is limited, and thus, the failure can be easily corrected. Furthermore, as illustrated in FIGS. 22, 23, and 24, a configuration may be adopted in which each stage of the shift register circuit SR includes a terminal Qn for outputting a drive signal to another stage.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A liquid crystal display apparatus comprising:
 a plurality of pixels arrayed in a matrix shape having a plurality of pixel rows and a plurality of pixel columns;
 a plurality of gate bus lines, each being associated with one of the plurality of pixel rows;
 a plurality of source bus lines, each being associated with one of the plurality of pixel columns; and
 a plurality of sub-gate bus lines, each being associated with one of the plurality of pixel rows,
 wherein each of the plurality of pixels includes
 a first liquid crystal capacitor including a first pixel electrode,
 a second liquid crystal capacitor including a second pixel electrode,
 a first TFT including a drain electrode connected to the first pixel electrode,
 a second TFT including a drain electrode connected to the second pixel electrode, and
 a buffer capacitor including a buffer capacitor electrode connected to the second pixel electrode via a third TFT,
 gate electrodes of the first TFT and the second TFT of each of the plurality of pixels are connected to the gate bus line associated with the pixel row including the pixel,
 source electrodes of the first TFT and the second TFT of each of the plurality of pixels are connected to the source bus line associated with the pixel column including the pixel,
 a gate electrode of the third TFT of each of the plurality of pixels is connected to the sub-gate bus line associated with the pixel row including the pixel,
 the liquid crystal display apparatus further includes a source drive circuit configured to supply a source signal to the plurality of source bus lines, and a gate drive circuit configured to supply a gate scanning signal, including a gate-on pulse configured to turn on the first TFT and the second TFT, to the plurality of gate bus lines, and to supply a sub-gate scanning signal, including a sub-gate-on pulse configured to turn on the third TFT, to the plurality of sub-gate bus lines, and
 the gate scanning signal is independently supplied to the plurality of gate bus lines one by one, and the sub-gate-on pulse is substantially simultaneously applied to the third TFTs belonging to at least two of the pixel rows.

2. The liquid crystal display apparatus according to claim 1,
 wherein the gate scanning signal is independently supplied to the plurality of gate bus lines one by one, and the sub-gate scanning signal common to at least two of the sub-gate bus lines associated with the at least two pixel rows is supplied to the plurality of sub-gate bus lines.

3. The liquid crystal display apparatus according to claim 2,
 wherein the at least two sub-gate bus lines are electrically connected to each other.

4. The liquid crystal display apparatus according to claim 1,
 wherein the at least two pixel rows include two pixel rows adjacent to each other, and
 the third TFTs belonging to the two pixel rows are connected to a common sub-gate bus line.

5. The liquid crystal display apparatus according to claim 4,
 wherein the second pixel electrode of one pixel belonging to one of the two pixel rows and the second pixel electrode of a pixel belonging to the other of the two pixel rows and in the same column as the one pixel are arranged to be adjacent to each other with the common sub-gate bus line interposed therebetween in a plan view.

6. The liquid crystal display apparatus according to claim 4,
 wherein in a pixel belonging to one of the two pixel rows, the second pixel electrode is located closer to a side of the other of the two pixel rows than the first pixel electrode, and in a pixel belonging to the other of the two pixel rows, the second pixel electrode is located closer to a side of the one of the two pixel rows than the first pixel electrode.

7. The liquid crystal display apparatus according to claim 1,
 wherein the gate drive circuit is formed on a same substrate as the plurality of gate bus lines and the plurality of sub-gate bus lines.

8. The liquid crystal display apparatus according to claim 7,
 wherein the gate drive circuit includes a shift register circuit, and in the shift register circuit, a number of stages configured to output the sub-gate scanning signal is smaller than a number of stages configured to output the gate scanning signal.

9. The liquid crystal display apparatus according to claim 7,
wherein the gate drive circuit includes a shift register circuit, and the shift register circuit has a stage configured to output the gate scanning signal and the sub-gate scanning signal.

10. The liquid crystal display apparatus according to claim 9,
wherein the shift register circuit has a stage configured to output only the sub-gate scanning signal.

11. The liquid crystal display apparatus according to claim 10,
wherein the sub-gate scanning signal output from the stage configured to output the gate scanning signal and the sub-gate scanning signal is supplied to one of the sub-gate bus lines, and the sub-gate scanning signal output from the stage configured to output only the sub-gate scanning signal is supplied to at least two of the sub-gate bus lines associated with the at least two pixel rows.

12. The liquid crystal display apparatus according to claim 9,
wherein the plurality of gate bus lines are not directly connected to the plurality of sub-gate bus lines.

13. The liquid crystal display apparatus according to claim 7,
wherein the gate drive circuit includes a shift register circuit, and
a p phase (p is an integer of 2 or more) clock signal is sequentially input to each stage of the shift register circuit, and the sub-gate-on pulse is substantially simultaneously applied to the third TFTs belonging to consecutive q pixel rows (q is an integer of 2 or more), the integer q not having a common divisor other than 1 with respect to the phase number p of the clock signal.

14. The liquid crystal display apparatus according to claim 7,
wherein the gate drive circuit includes a shift register circuit, and
a p phase (p is an integer of 2 or more) clock signal is sequentially input to each stage of the shift register circuit, and the sub-gate-on pulse is substantially simultaneously applied to the third TFTs belonging to a plurality of the pixel rows separated from each other by r pixel rows (r is a multiple of p).

* * * * *